US012617352B2

(12) United States Patent
Mashimo

(10) Patent No.: US 12,617,352 B2
(45) Date of Patent: May 5, 2026

(54) STRUCTURE AND PERFORMANCE REDUCTION SUPPRESSION DEVICE

(71) Applicant: TOYOTA JIDOSHA KABUSHIKI KAISHA, Toyota (JP)

(72) Inventor: Takayuki Mashimo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 260 days.

(21) Appl. No.: 18/502,821

(22) Filed: Nov. 6, 2023

(65) Prior Publication Data

US 2024/0149802 A1 May 9, 2024

(30) Foreign Application Priority Data

Nov. 9, 2022 (JP) .................................. 2022-179319

(51) Int. Cl.
*B60R 13/10* (2006.01)
*G01S 13/931* (2020.01)

(52) U.S. Cl.
CPC .......... *B60R 13/105* (2013.01); *G01S 13/931* (2013.01); *G01S 2013/93271* (2020.01)

(58) Field of Classification Search
None
See application file for complete search history.

(56) References Cited

U.S. PATENT DOCUMENTS

| | | | | | |
|---|---|---|---|---|---|
| 4,126,864 | A | * | 11/1978 | Hopkins | H01Q 1/427 |
| | | | | | 52/24 |
| 6,072,440 | A | * | 6/2000 | Bowman | H01Q 1/42 |
| | | | | | 343/872 |
| 6,674,392 | B1 | * | 1/2004 | Schmidt | G01S 13/931 |
| | | | | | 343/873 |
| 10,427,689 | B2 | | 10/2019 | Tokimasa et al. | |
| 10,486,698 | B2 | | 11/2019 | Masui et al. | |
| 10,583,737 | B2 | | 3/2020 | Chiba et al. | |
| 10,793,147 | B2 | | 10/2020 | Kaminade et al. | |
| 10,922,561 | B2 | | 2/2021 | Ozawa et al. | |
| 11,072,328 | B2 | | 7/2021 | Masui et al. | |
| 11,131,769 | B2 | | 9/2021 | Mizuno et al. | |
| 11,235,766 | B2 | | 2/2022 | Masui et al. | |
| 11,247,671 | B2 | | 2/2022 | Komori | |
| 2018/0321357 | A1 | * | 11/2018 | Kim | G01S 13/931 |
| 2019/0232924 | A1 | | 8/2019 | Orazem | |
| 2020/0100367 | A1 | * | 3/2020 | Antaya | G01S 13/931 |
| 2020/0103522 | A1 | * | 4/2020 | Singh | G01S 13/931 |
| 2020/0346596 | A1 | * | 11/2020 | Allen | G09F 7/18 |
| 2021/0364631 | A1 | | 11/2021 | Hasegawa et al. | |

FOREIGN PATENT DOCUMENTS

| | | | | | |
|---|---|---|---|---|---|
| DE | 102022109904 | A1 | * | 10/2023 | .......... G01S 13/931 |
| JP | 2001-311265 | A | | 11/2001 | |
| JP | 2019-116162 | A | | 7/2019 | |

* cited by examiner

*Primary Examiner* — Bernarr E Gregory

(74) *Attorney, Agent, or Firm* — Sughrue Mion, PLLC

(57) ABSTRACT

To effectively suppress deterioration in performance of the radar caused by the ice column, provided is a structure for prevent the performance degradation of a radar, the radar is provided below a plate member disposed on an outer surface of a vehicle and irradiating a radio wave toward an outside of the vehicle. The structure is comprising an ice column suppressing part configured to suppressing the formation of the ice column depending from the lower end of the plate member toward an irradiation area of the radio wave.

5 Claims, 5 Drawing Sheets

START

S100
RECEPTION LEVEL (POWER VALUE) : ACQUIRE

S110
POWER VALUE > THRESHOLD VALUE? — No

Yes

S120
COUNT VALUE : COUNT UP

S130
COUNT VALUE : COUNT DOWN

S140
TRANSMITS DETERMINATION VALUE

RETURN

START

S200
CD ≧ CDv? — No

Yes

S210
HEATER : ON

S220
CD < CDv? — No

Yes

S230
HEATER : OFF

RETURN

FIG.4A
FIG.4B
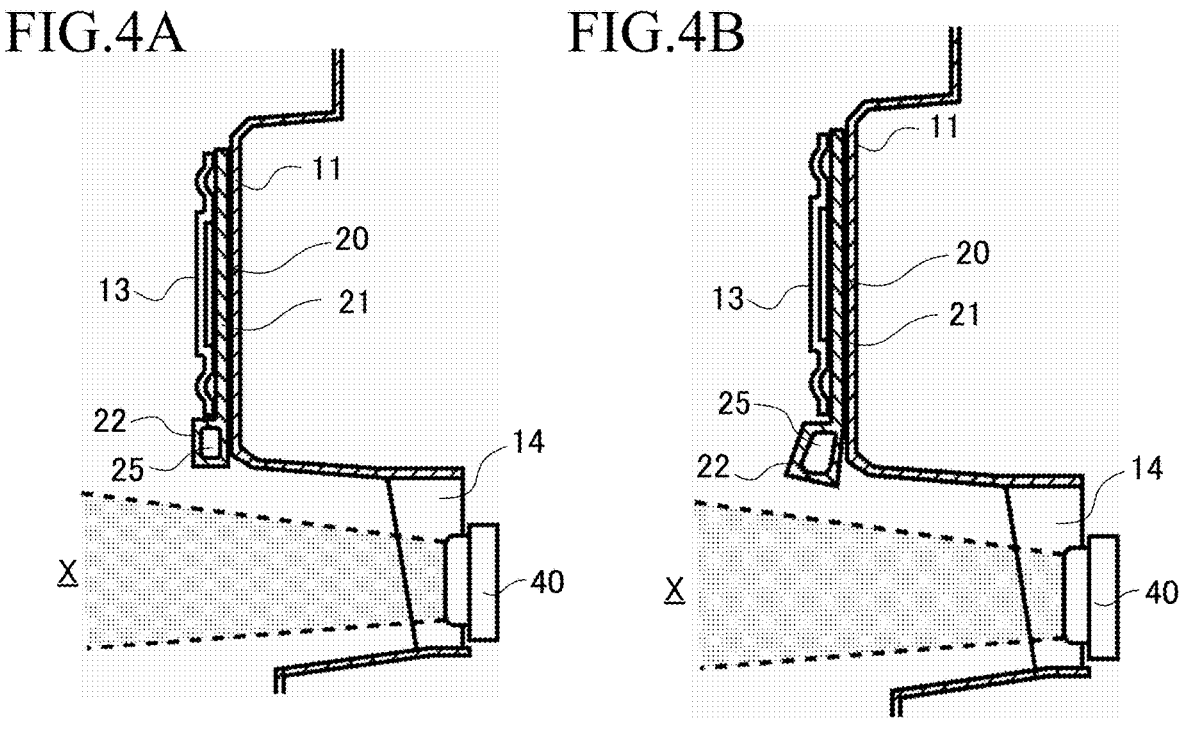
FIG.4C
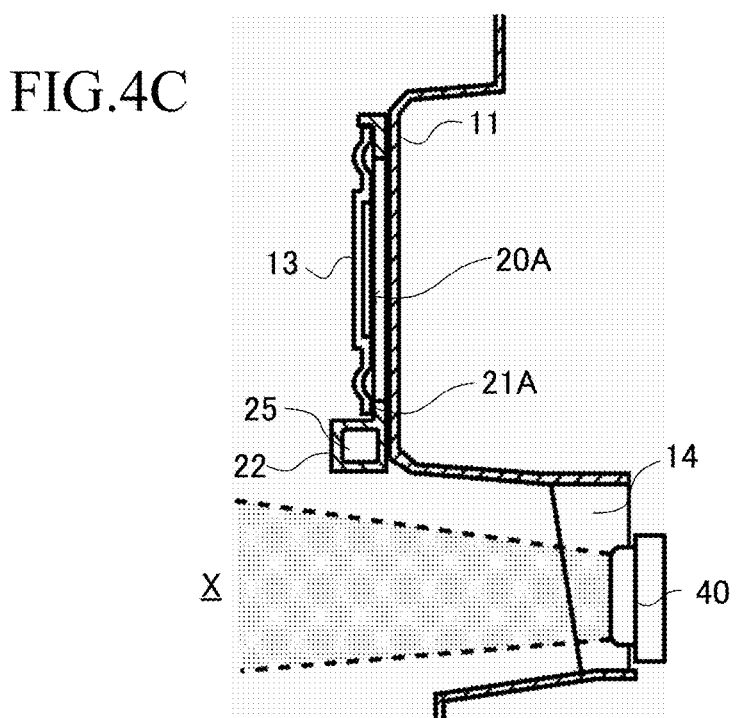

STRUCTURE AND PERFORMANCE REDUCTION SUPPRESSION DEVICE

CROSS-REFERENCE TO RELATED APPLICATION

This application claims priority to Japanese Patent Application No. JP2022-179319 filed on Nov. 9, 2022, the content of which is hereby incorporated by reference in its entirety into this application.

BACKGROUND OF THE INVENTION

1. Field of the Invention

The present disclosure relates to a structure and a performance reduction suppression device, and relates to a technique suitable for suppressing performance reduction of a radar mounted on a vehicle.

2. Description of the Related Art

For example, Japanese Patent Application Laid-Open (kokai) No. 2001-311265 discloses an apparatus including a planar heating element protruding from an eaves of a roof and configured to suppress generation of an ice column at the eaves by heating snow accumulated on the roof with the planar heating element.

In some cases, a radar for recognizing an object or the like existing around the vehicle is mounted on the vehicle. Among such radars, a radar that recognizes the front of the vehicle may be disposed on, for example, a lower grille below a license plate attached to the front surface of the front bumper.

Generally, the lower grille is offset to the rear side of the vehicle body relative to the license plate. Therefore, in a configuration in which a radar is disposed on a lower grill, when the vehicle travels on a road surface covered with snow of snowfall or semi-molten snow (sherbet snow or slushy snow, hereinafter referred to as "wet snow"), wet snow adhering to the front surface of the license plate may flow downward and form an ice column hanging from the lower end of the license plate toward the radar. When such the ice column enters the irradiation area of the radio wave of the radar, there is a problem that the recognition performance of the radar is reduced.

SUMMARY OF THE INVENTION

The present disclosure has been made in order to solve the above described problems, and an object thereof is to effectively suppress deterioration in performance of the radar caused by the ice column.

A structure for prevent the performance degradation of a radar, the radar is provided below a plate member disposed on an outer surface of a vehicle and irradiating a radio wave toward an outside of the vehicle. The structure is comprising an ice column suppressing part configured to suppressing the formation of the ice column depending from the lower end of the plate member toward an irradiation area of the radio wave.

According to the above aspect, it is possible to effectively prevent the formation of the ice column depending on the irradiation area of the radio wave of the radar, and thus it is possible to effectively suppress the deterioration in the performance of the radar.

BRIEF DESCRIPTION OF THE DRAWINGS

FIG. 4A to 4C are schematic cross sectional views illustrating a structure according to a modification.

DESCRIPTION OF THE EMBODIMENTS

Description is now given of a structure and a performance reduction suppression device according to at least one embodiment of the present disclosure with reference to the drawings.

Figure 1A:
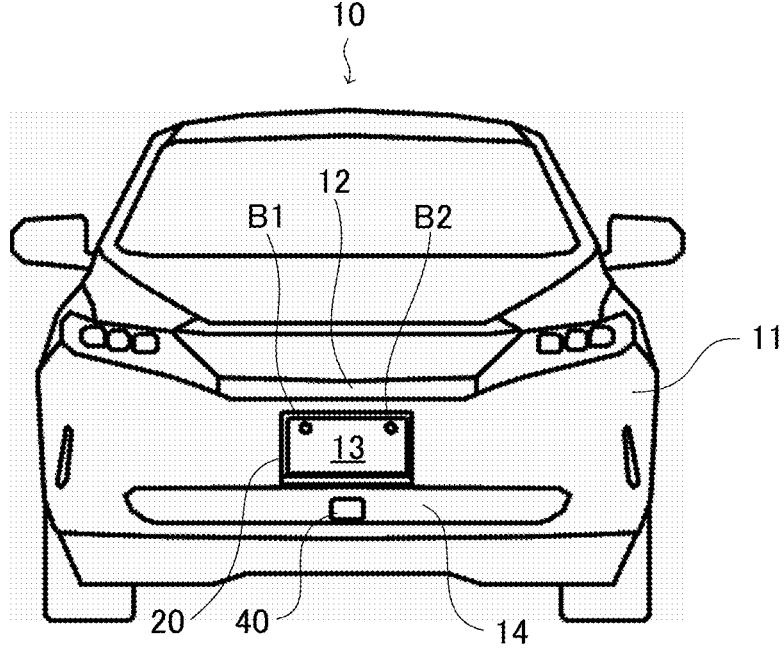
FIG. 1A is a schematic view of the vehicle according to the present embodiment viewed from the front.
Figure 1B:
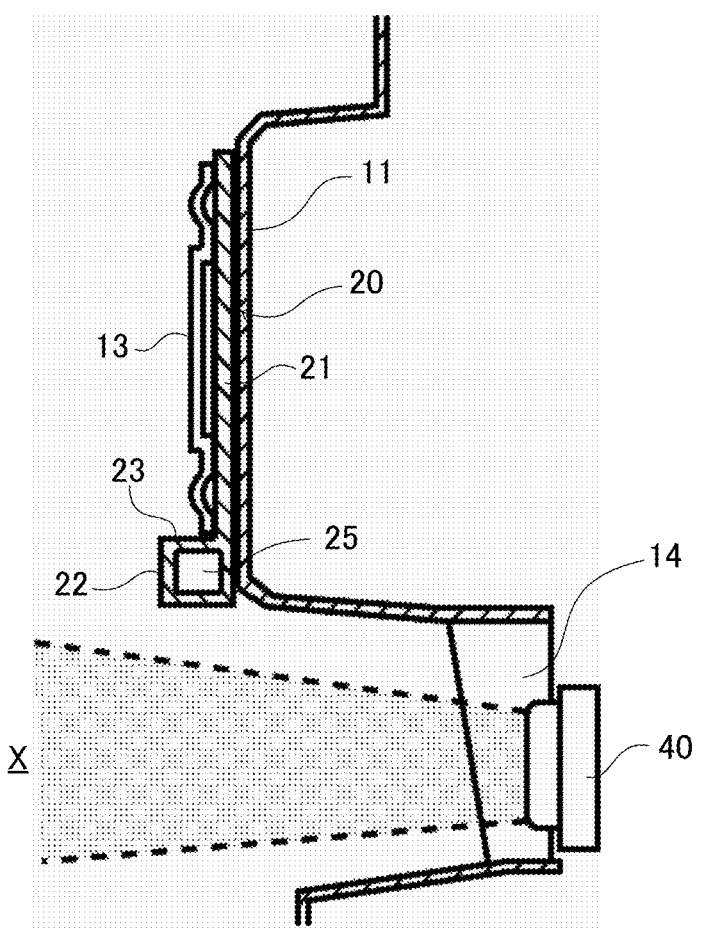
FIG. 1B is a schematic cross sectional view illustrating a structural according to the present embodiment.

FIG. 1A is a schematic view of the vehicle according to the present embodiment viewed from the front. FIG. 1B is a schematic cross sectional view illustrating a structural according to the present embodiment. As shown in FIG. 1A, a front bumper 11 extending in a vehicle widthwise direction is attached to a front portion of a vehicle 10. An upper grille 12 for taking in the traveling wind is provided above the front bumper 11. In the present disclosure, the vehicle 10 may not include the upper grille 12.

A license plate bracket (hereinafter, referred to as a bracket) 20 for fixing a license plate 13 is provided at a substantially center of the front bumper 11 in the vehicle width direction and most protruding toward the front side of the vehicle 10. The bracket 20 is attached to the front bumper 11 by a bolt nut (not shown) or the like in a state where the rear surface thereof is brought into contact with the front surface of the front bumper 11. A pair of left and right rear surface nuts (not shown) is fixed to the bracket 20. The license plate 13 is attached by screwing a pair of left and right bolt B1, B2 into the rear nut of the bracket 20 while the rear surface thereof contacts the front surface of the bracket 20.

The length of the bracket 20 in the vehicle width direction is substantially the same as the length of the license plate 13 in the vehicle width direction. Further, the vertical height of the bracket 20 is substantially the same as the vertical height of the license plate 13. Note that the shapes of the brackets 20 and the license plate 13 may be shapes based on laws and regulations of countries and regions in which the vehicle 10 is used, and may be rectangles that are longer in the vehicle widthwise direction than the rectangles shown in the FIG. 1A.

A lower grille 14 for taking in the traveling wind is provided below the bracket 20 of the front bumper 11. A millimeter wave radar 40 for detecting an object existing in a front region of the vehicle 10 is attached to substantially the center of the lower grille 14 in the vehicle width direction.

The millimeter wave radar 40 radiates a radio wave (millimeter wave) in a millimeter wave band, and receives the millimeter wave (reflected wave) reflected by a target existing within a radiation range. The millimeter wave radar 40 acquires the relative distance between the vehicle 10 and the target, the relative speed between the vehicle 10 and the target, and the like based on a phase difference between the transmitted millimeter wave and the received reflected wave, an attenuation level of the reflected wave, a time from the transmission of the millimeter wave to the reception of the reflected wave, and the like. The relative position and the relative speed of the object acquired by the millimeter wave radar 40 are used, for example, for a driving assistance control of the vehicle 10. Examples of the driving assistance control include a following vehicle to vehicle distance control (ACC: Adaptive Cruise Control), a lane maintenance control (LTA: Lane Tracing Asist), a lane deviation suppression control (LDA: Lane Departure Alert Control), and the like. The driving assistance control is a concept which encompasses an automatic driving control.

As shown in FIG. 1B, the millimeter wave radar 40 is provided on the lower grille 14 that is offset from the front surface of the front bumper 11 toward the rear of the vehicle. That is, the lower end of the bracket 20 is positioned obliquely above the millimeter wave radar 40. The reference numeral X in FIG. 1B indicates the radiation range of the radio wave (millimeter wave) of the millimeter wave radar 40. The millimeter wave radar 40 is attached to a desired position of the lower grille 14 so that the lower end of the bracket 20 is not included in the irradiation area X.

When the vehicle 10 travels on a road surface covered with the snowfall or the wet snow, the wet snow adheres to the front surface of the license plate 13. The wet snow adhering to the front surface of the license plate 13 flows downward along the front surface of the license plate 13, and forms the ice column hanging downward from the lower end of the license plate 13. Since the license plate 13 is positioned obliquely above the millimeter wave radar 40, the ice column depending from the lower end of the license plate 13 may enter the irradiation area X of the radio wave of the millimeter wave radar 40. The millimeter wave radar 40 irradiates the radio wave toward the front, and receives the reflected wave reflected by the object. Therefore, when the ice column hanging down from the license plate 13 is formed by entering the irradiation area X of the radio wave of the millimeter wave radar 40, the irradiation property and the reception property of the radio wave are affected, and the recognition performance of the millimeter wave radar 40 is deteriorated.

In order to prevent the formation of such the ice column, it is conceivable that the license plate 13 is entirely heated by a heater or the like. However, the provision of a heater on the front surface of the license plate 13 cannot be adopted for reasons of regulations or the like. In addition, in a case where a structure in which a heater is provided on the rear surface of the license plate 13 is adopted, the license plate 13 is cooled by the traveling wind, and the heat transfer efficiency is lowered, thereby increasing power consumption.

In the present embodiment, in order to solve these problems, a heater 25 as a heating element is disposed at the lower end of the bracket 20. Specifically, the bracket 20 has a plate portion 21 for seating the rear surface of the license plate 13, and an edge portion 22 formed at the lower end of the plate portion 21 and having a rectangular cross section extending in the vehicle width direction. The plate portion 21 and the edge portion 22 may be integrally formed or may be formed of separate members. The edge portion 22 is an example of a holding portion of the present disclosure.

The edge portion 23 is located below the lower end of the license plate 13 and above the irradiation area X of the radio waves of the millimeter wave radar 40 in a front view of the vehicle 10. The heater 25 extending in the vehicle width direction is embedded in the edge portion 22. The heater 25 is, for example, an electric heating wire, and heats the edge portion 22, that is, the vicinity of the lower end of the license plate 13 by the electric heating wire generating heat when the electric power is supplied.

The edge portion 22 protrudes forward from the front surface of the license plate 13 in a side view of the vehicle 10. That is, the step portion 23 is formed near the lower end of the license plate 13 by the upper surface of the edge portion 22. The step portion 23 functions to receive the wet snow flowing down along the front surface of the license plate 13.

By heating the edge portion 22 by the heater 25 in a state where the wet snow is received by the step portion 23, the wet snow attached to the license plate 13 can be efficiently melted. That is, it is possible to reliably prevent the formation of the ice column depending from the lower end of the license plate 13. By preventing the formation of the ice column, it is possible to suppress the deterioration of the recognition performance of the millimeter wave radar 40. Further, compared with the case where the entire license plate 13 is heated from the back side, heat can be efficiently transferred to the wet snow received by the step portion 23, and power consumption can be reliably suppressed.

Figure 2:
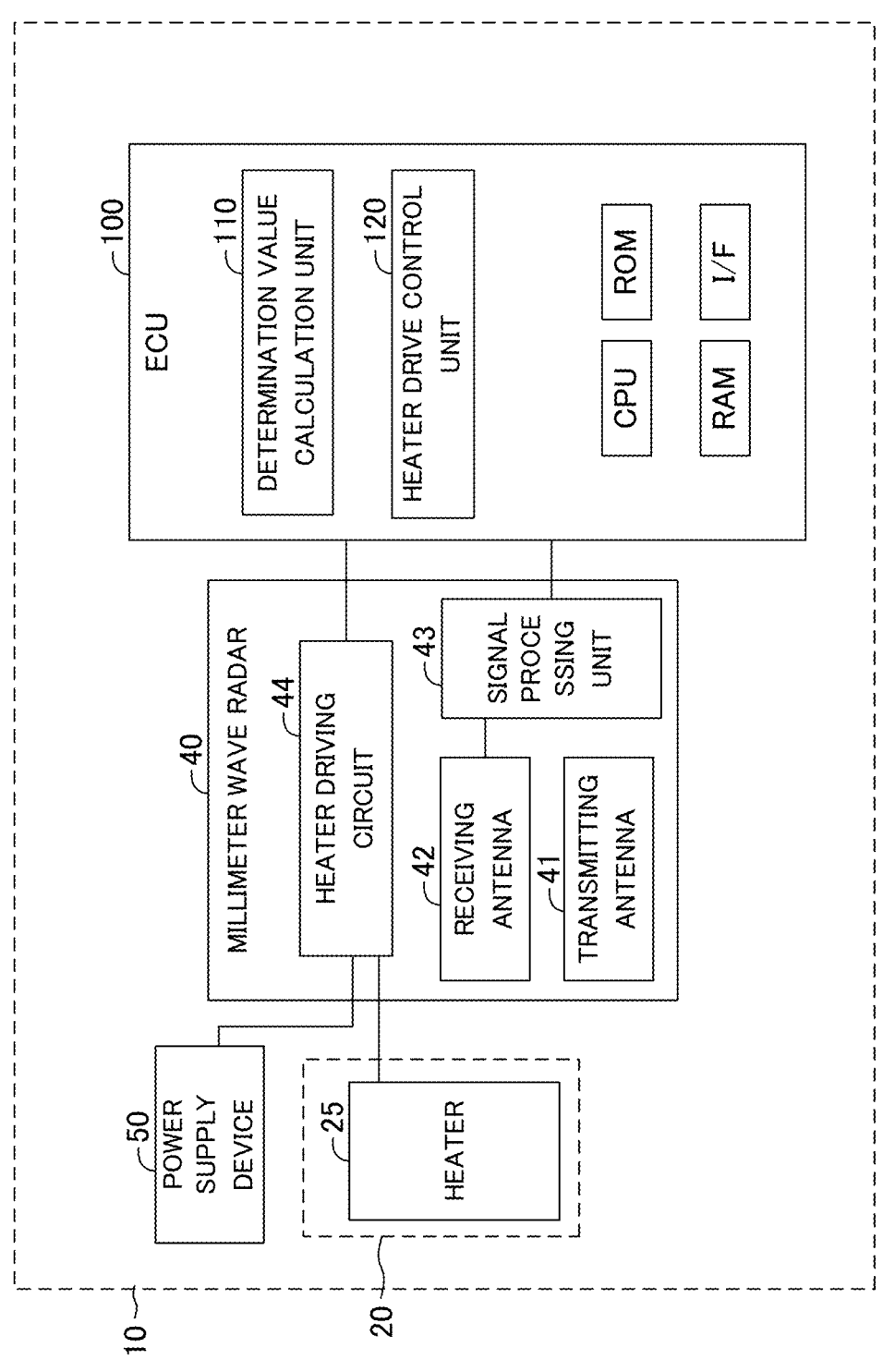
FIG. 2 is an overall configuration diagram of the performance reduction suppression device according to the present embodiment.

FIG. 2 is an overall configuration diagram of the performance reduction suppression device according to the present embodiment. As shown in FIG. 2, the vehicles 10 have a ECU (Electronic Control Unit) 100. The ECU 100 includes a CPU (Central Processing Unit), ROM (Read Only Memory), RAM (Random Access Memory), an interface device IF, and the like. The CPU executes various programs stored in the ROM. The ROM is a non-volatile memory that stores data and the like required for the CPU to execute various programs. The RAM is a volatile memory to provide a working region that is deployed when various programs are executed by the CPU. The interface device IF is a communication device for communicating with an external device.

The ECU 100 is a central device which executes various kinds of control of the vehicles 10. In the present embodiment, the millimeter wave radar 40 is communicably connected to the ECU 100. The millimeter wave radar 40 includes a transmitting antenna 41 that transmits millimeter waves, a receiving antenna 42 that receives reflected waves, a signal processing unit 43, a heater driving circuit 44 that controls driving of the heater 25, and the like.

The heater driving circuit 44 is connected to a power supply device 50 mounted on the vehicle 10. The heater driving circuit 44 includes a relay (not shown). The relays of the heater driver 44 are selectively switched between an energized state and a cut-off state in response to an instruction from the ECU 100. Hereinafter, a state in which the relay is in an energized state is referred to as an ON state of the heater driving circuit 44, and a state in which the relay is in an interrupted state is referred to as an OFF state of the heater driving circuit 44. When the heater driving circuitry 44 is in the ON state, electric power is supplied from the power supply device 50 to the heater 25, and the heater 25 generates heat. On the other hand, when the heater driving circuit 44 is in the OFF state, the power supply device 50 and the heater 25 are disconnected from each other, and no electric power is supplied to the heater 25.

Next, the heating control by the heater 25 will be described. The ECU 100 includes a determination value calculation unit 110 and a heater drive control unit 120 as some functional elements. Those functional elements are described as being included in the ECU 100 which is integrated hardware, but any part thereof may be provided to an ECU independent of the ECU 100. In addition, a part of the functional elements of the ECU 100 may be provided in an external information processing device or the like capable of communicating with the vehicles 10.

The determination value calculation unit 110 calculates a determination value CD serving as an index for determining a decrease in the recognition performance of the millimeter wave radar 40. When dirt adheres to a cover member (not shown) that transmits radio waves of the millimeter wave radar 40, or the ice column is formed in the irradiation area A (see FIG. 1B) of the radio waves of the millimeter wave radar 40, part of the radio waves transmitted from the transmission antenna 41 is reflected by these dirt and ice columns, and is received by the reception antenna 42. On the other hand, when no dirt is attached to the cover member or when no ice column is present in the irradiation area A, no dirt or reflection from the ice column is present. That is, a difference occurs in the reception level of the radio wave received by the reception antenna 42 between a case where there is dirt or ice column and a case where there is no ice column. The determination value calculation unit 110 calculates the determination value CD based on the reception level of the radio wave received by the reception antenna 42.

Figures 3A, 3B:
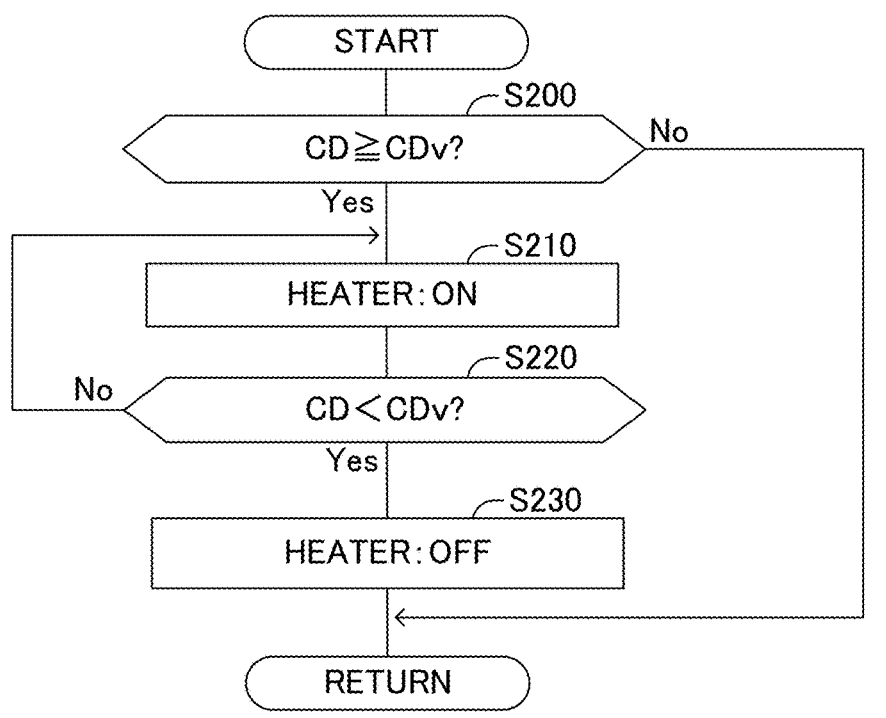
FIG. 3A is a flow chart for explaining a routine of a calculation process of a determination value.
FIG. 3B is flow chart for explaining a routine of a heat control process.

Hereinafter, an example of calculation process performed by the determination value calculation unit 110 will be described based on a flowchart illustrated in the FIG. 3A. The routine illustrated in the FIG. 3A is started when an ignition switch or a power switch of the vehicle 10 is turned ON and the millimeter wave radar 40 is activated.

In step S100, the determination value calculation unit 110 acquires, from the signal processing unit 43, the reception level (power value) of the radio wave received by the receiving antenna 42. Next, in step S110, the determination value calculation unit 110 determines whether or not the acquired power value exceeds a predetermined determination threshold value. When the power value exceeds the determination threshold value (Yes), the determination value calculation unit 110 advances the process to step S120 and counts up the count value (determination value) CD of the determination counter. On the other hand, when the power value does not exceed the determination threshold value (No), the determination value calculation unit 110 advances the process to step S130, and counts down the count value (determination value) CD of the determination counter. In step S140, the determination value calculation unit 110 transmits the determination value CD that has been counted up or counted down to the heater drive control unit 120, and then ends (returns) the routine.

The heater drive control unit 120 switches the heater drive circuit 44 to ON state or OFF state based on the determination value CD transmitted from the determination value calculation unit 110. Specifically, when the determination value CD transmitted from the determination value calculation unit 110 reaches the predetermined operation threshold CDv, the heater drive control unit 120 turns ON the heater drive circuit 44 and energizes the heater 25, thereby executing a heating control for generating heat of the heater 25. Further, after the heater driving control unit 120 turns ON the heater driving circuit 44, when the determination value CD transmitted from the determination value calculation unit 110 is smaller than the operation threshold CDv, the heater driving circuit 44 is turned OFF to terminate the heating control.

Hereinafter, an example of a heating control process performed by the heater drive control unit 120 will be described with reference to a flowchart illustrated in the FIG.

3B. The routine illustrated in the FIG. 3B is executed in parallel with the routine of the determination value calculation processing illustrated in the FIG. 3A.

In step S200, the heater drive control unit 120 determines whether or not the determination value CD has reached the operation threshold CDv. When the determination CD reaches the operation threshold CDv (Yes), the heater drive control unit 120 advances the process to step S210. On the other hand, when the determination CD does not reach the operation threshold CDv (No), the heater drive control unit 120 returns this routine.

In step S210, the heater driving control unit 120 states ON the heater driving circuitry 44. That is, the heating control for energizing the heater 25 is executed. Next, in step S220, the heater drive control unit 120 determines whether or not the determination value CD is smaller than the operation threshold CDv. When the determination CD is less than the operation threshold CDv (Yes), the heater drive control unit 120 advances the process to step S230. On the other hand, when the determination value CD has not decreased to the operation threshold CDv (No), the heater drive control unit 120 returns to the process of step S210 and continues the heat control.

In step S230, the heater driving control unit 120 states OFF the heater driving circuitry 44. That is, the heating control by the heater 25 is ended. Thereafter, the heater drive control unit 120 temporarily ends (returns) this routine.

Although the heater drive control unit 120 has been described as determining the execution of the heating control based on the determination CD, it may be configured to determine the execution of the heating control based on other information. For example, in a case where the outside air temperature sensor mounted on the vehicle 10 detects a predetermined low outside air temperature, and a situation in which snow fall is predicted, such as a case where the wiper apparatus of the windshield is operating, the heating control for turning ON the heater driving circuitry 44 may be executed. Alternatively, when the vehicle 10 acquires the weather information of snow fall, the heating control for turning ON the heater driving circuit 44 may be executed. In addition, when snow fall is acquired, ON and OFF states of the heater driving circuitry 44 are alternately repeated, so that the heating control can be executed intermittently.

In the above, the structure and the performance reduction suppression device according to the at least one embodiment have been described, but the present disclosure is not limited to the above-mentioned at least one embodiment, and various modifications are possible within the range not departing from the object of the present disclosure.

For example, in the above embodiment, the edge portion 22 of the bracket 20 has been described as projecting forward from the front surface of the license plate 13, as shown in FIG. 4A, the front surface of the edge portion 22, the front surface of the license plate 13 can be configured to be on the same plane.

Further, as shown in the FIG. 4B, the front surface of the edge portion 22 may be inclined. In this case, the front surface of the edge portion 22 may be inclined so that the lower end of the front surface of the edge portion 22 is located closer to the vehicle front side than the upper end.

Further, the present disclosure is not limited to the brackets 20, and the present disclosure can be applied to a license plate frame 20A as shown in FIG. 4C. Specifically, the license plate frame 20A includes a rectangular frame-shaped frame portion 21A and the edge portion 22 extending along the lower end of the frame portion 21A. The frame portion 21A and the edge portion 22 may be integrally formed or may be formed of separate members. Similar to the above described embodiment, the heaters 25 may be provided in the edge portion 22 in the embodiment shown in the FIG. 4C.

Figure 5:
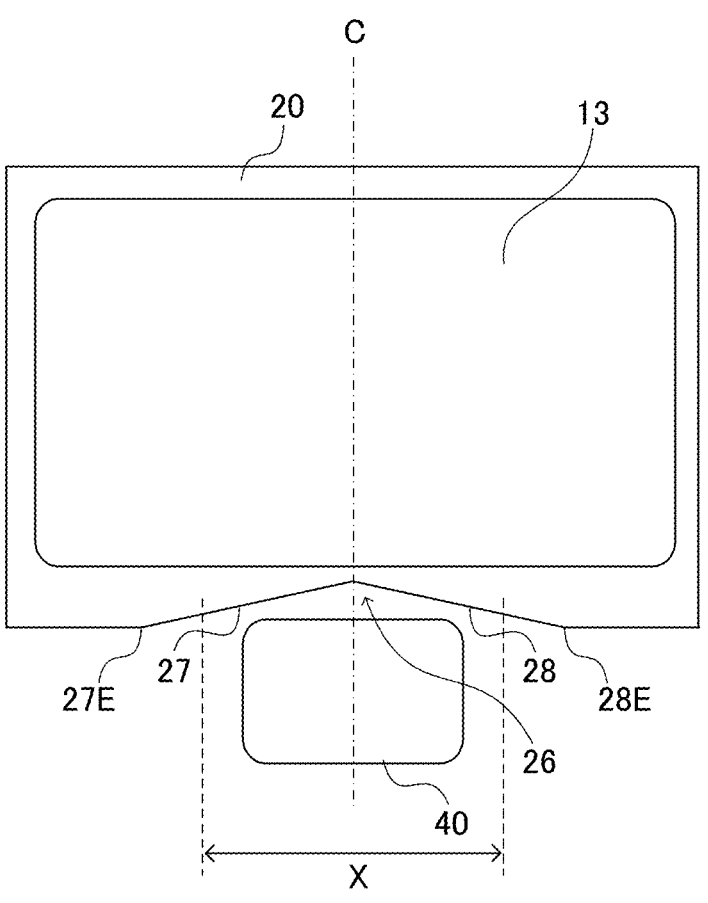
FIG. 5 is a schematic front view illustrating a structure according to a modification.

Further, in the present disclosure, the ice column suppressing part does not necessarily have to include a heating element such as the heater 25, and may have a structure in which the ice column is not grown in the irradiation area X of the radio wave of the millimeter wave radar 40 even if the ice column is formed. Specifically, as shown in FIG. 5, in a front view of the license plate 13, the lower end of the bracket 20 (or the license plate frame 20A) may be provided with a cutout portion 26 cut out in a substantially inverted V-shape. The cutout portion 26 has a pair of inclined portions 27 and 28 that incline downward from a substantially center C in the vehicle width direction of the bracket 20, in other words, from a substantially center in the left-right direction of the irradiation area X of the radar 40 toward the outside in the vehicle width direction (the left-right end sides of the irradiation area X).

As described above, by providing the substantially inverted V-shaped cutout portion 26 at the lower end of the brackets 20, the wet snow flowing down along the front surface of the licensing plate 13 flows along the inclined portions 27 and 28 of the cutout portion 26, and reaches the end portion 27E and 28E deviating from the irradiation area X of the radio wave of the millimeter wave radar 40. That is, even if the ice column hanging downward from the end portion 27E and 28E grows, these ice columns are formed outside the irradiation area X. This makes it possible to effectively suppress degradation in performance of the millimeter wave radar 40.

Note that, although FIG. 5 shows the cutout portion 26 as an example, as long as it is a structure capable of guiding the wet snow to the outside of the irradiation area X of the radio wave of the millimeter wave radar 40, for example, it is also possible to adopt a configuration in which a guide projection or a guide groove having a substantially inverted V-shape is provided.

Further, the application of the present disclosure is not limited to the millimeter wave radar 40 for detecting the front of the vehicle 10, as long as the millimeter wave radar is offset to the inner side of the member disposed on the outer surface of the vehicle 10, it is possible to apply to the millimeter wave radar for detecting obliquely front, left and right sides, rear, and the like. Further, the radar is not limited to the millimeter wave radar, and can be widely applied to other sensors such as a Lidar.

What is claimed is:

1. A structure for preventing performance degradation of a radar provided below a plate member disposed on an outer surface of a vehicle, the radar radiating a radio wave toward an outside of the vehicle, the structure comprising:

an ice column suppressing part configured to suppress formation of an ice column hanging from a lower end of the plate member toward an irradiation area of the radio wave, wherein the ice column suppressing part includes a holding portion for holding a heating element, the holding portion provided at a portion below the lower end of the plate member and above the irradiation area, and wherein an end of the holding portion facing the outside of the vehicle is formed on an extension line of a surface of the plate member or protrudes further outward from the vehicle than the surface.

2. A structure for preventing performance degradation of a radar provided below a plate member disposed on an outer surface of a vehicle, the radar radiating a radio wave toward an outside of the vehicle, the structure comprising:

an ice column suppressing part configured to suppress formation of an ice column hanging from a lower end of the plate member toward an irradiation area of the radio wave, wherein the ice column suppressing part includes a pair of inclined portions provided at a portion above the irradiation area, and wherein the pair of inclined portions is lower than the lower end of the plate member and is inclined downward from a center side in a horizontal direction of the irradiation area parallel to a planar direction of the plate member toward both ends.

3. The structure according to claim 1, wherein the plate member is a license plate disposed on a front surface of a front bumper of the vehicle, and wherein the inclined portion is provided at a lower end of a bracket or a frame for attaching the license plate to the front bumper.

4. A performance reduction suppression device comprising the structure according to claim 1, comprising:

a determination value calculation unit configured to calculate a determination value for determining whether the performance of the radar is deteriorated based on the reception level of the radio wave received by the radar, and a control unit configured to execute a heating control which generates heat of the heating element when the determination value reaches a predetermined threshold value and stopping heat generation of the heating element when the determination value decreases below the threshold value.

5. The structure according to claim 2, wherein the plate member is a license plate disposed on a front surface of a front bumper of the vehicle, and wherein the inclined portion is provided at a lower end of a bracket or a frame for attaching the license plate to the front bumper.

* * * * *